United States Patent [19]
Claxton et al.

[11] 3,826,902
[45] July 30, 1974

[54] STRESS-STRAIN AND AREA READOUT INSTRUMENT

[75] Inventors: William E. Claxton, Mogadore; James E. Hollow, Cuyahoga Falls, both of Ohio

[73] Assignee: The Firestone Tire & Rubber Company, Akron, Ohio

[22] Filed: Apr. 16, 1973

[21] Appl. No.: 351,397

[52] U.S. Cl............................ 235/151.3, 73/89, 73/95
[51] Int. Cl.................................................. G06g 7/24
[58] Field of Search.................... 235/151.3, 151.32; 73/88 R, 89, 91–93, 95

[56] References Cited
UNITED STATES PATENTS

| | | | |
|---|---|---|---|
| 3,379,054 | 4/1968 | Folweiler | 73/95 |
| 3,447,363 | 6/1969 | Goldfinger | 73/89 X |
| 3,477,286 | 11/1969 | Baker | 73/95 |
| 3,554,019 | 1/1971 | Van Den Hove et al. | 73/89 |
| 3,558,866 | 1/1971 | Poulson | 235/151.3 |
| 3,733,049 | 5/1973 | Van Den Hove et al. | 235/151.3 |

*Primary Examiner*—Charles E. Atkinson
*Assistant Examiner*—Jerry Smith

[57] ABSTRACT

Disclosed is an instrument for calculating and reading out various parameters of tensile testing results. The instrument receives an input signal from the testing apparatus whose voltage is proportional to the elongation of the sample being tested and another input signal whose voltage is proportional to the force to which the sample is subjected. At the point of sample breakage the maximum elongation of the sample and maximum force applied to the sample is readily determined and signals proportional thereto are fed to a readout device. The instrument also includes means to calculate and display an indication of the work necessary to break the sample and in the event of cyclic testing, the area within the hysteresis loop resulting when the force is removed from the sample.

13 Claims, 1 Drawing Figure

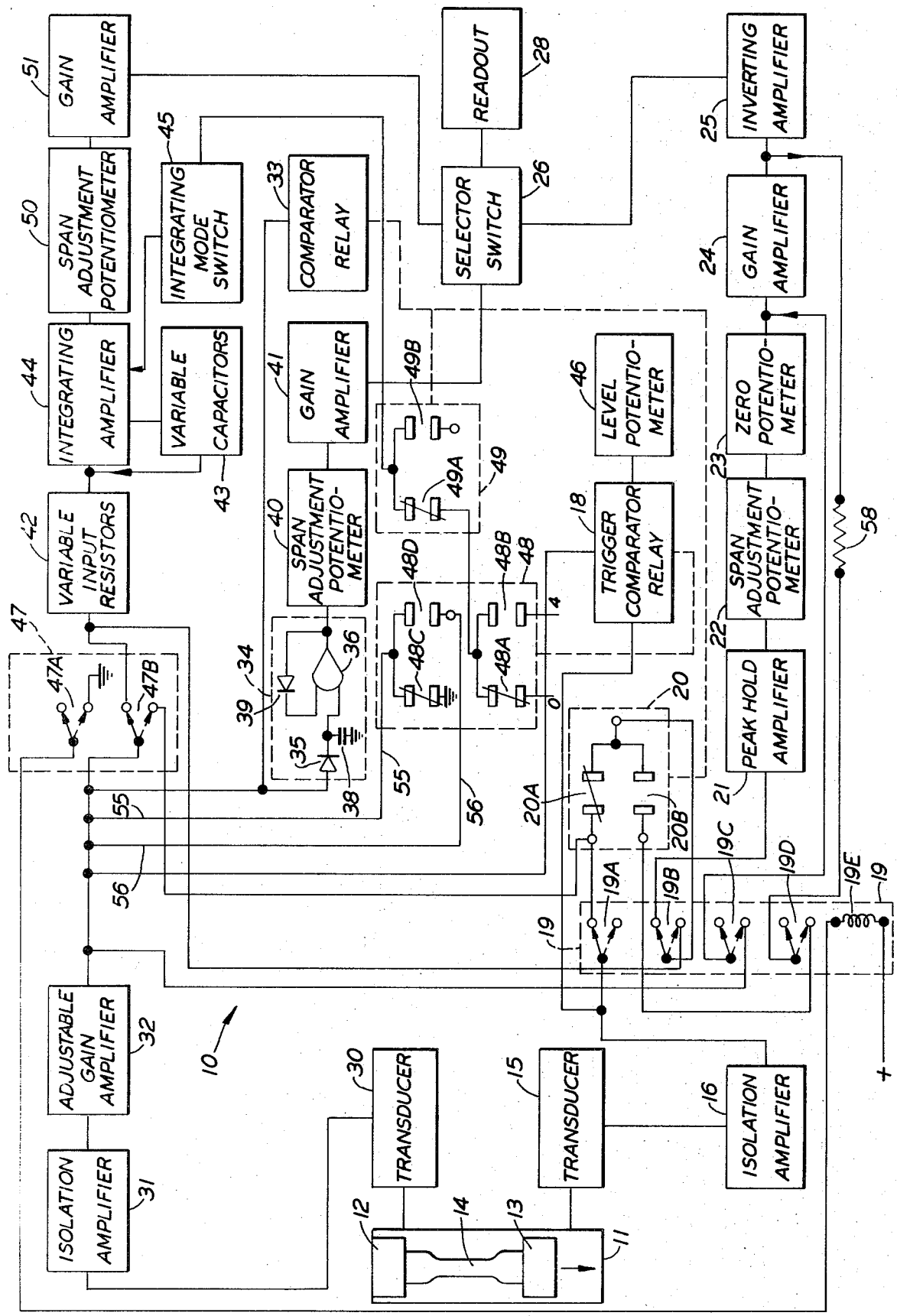

STRESS-STRAIN AND AREA READOUT INSTRUMENT

BACKGROUND OF THE INVENTION

This invention relates to an apparatus for reading out results of a tensile strength testing machine. More particularly, this invention relates to an apparatus which will readily calculate and display such parameters as maximum elongation, maximum force, work and hysteresis derived from the stress-strain testing of a sample of material.

Machines which are capable of testing and determining the physical properties of a material through tensile loading are well known. Most often, the material to be tested is fixed between two jaws with one jaw moving away from the other to elongate and usually break the sample material. A great deal of information relating to the physical properties of the material can be gathered from such a test.

Of prime importance is stress-strain data which is obtained by such testing and usually displayed in the form of a stress-strain diagram or curve on an oscilloscope or recording device. A photograph of the scope screen or the output of the recording device itself can then be subjected to somewhat tedious analysis in order to determine parameters of interest such as the load and elongation at break, the energy or work expended to effect the break, and the area of a hysteresis loop should cyclic testing be desirable.

Certain instruments have been developed which are capable of monitoring individual parameters such as peak load or work but none have provided any degree of commercial feasibility in that each is limited to operation with respect to a single parameter. Thus, we are aware of no instrument which is of sufficient versatility to monitor and display every output of interest from a tensile testing device.

SUMMARY OF THE INVENTION

It is thus a primary object of the present invention to provide an instrument which is capable of selective monitoring and displaying all results of interest from a tensile test.

It is another object of the present invention to provide an instrument, as above, which will detect, hold and display the maximum elongation to which the sample is being subjected during the tensile test.

It is still another object of the present invention to provide an instrument, as above, which will detect, hold and display the maximum force to which the sample is subjected during the tensile testing procedure.

It is yet another object of the present invention to provide an instrument, as above, which will calculate and display the work which was necessary to break the sample.

It is a further object of the present invention to provide an instrument, as above, which will calculate and display the area within a hysteresis loop when data of this nature is desired.

It is a still further object of the present invention to provide an instrument, as above, with the capability of reading out the force at a preselected elongation or reading out the elongation at a preselected force.

These and other objects of the present invention which will become apparent from the following description are accomplished by improvements hereinafter described and claimed.

In general, an instrument for calculating and displaying results of a tensile test is adapted to receive signals from the tensile testing machine which are proportional to the force to which the sample is being subjected and the elongation of the sample. At the point the sample breaks, both signals are trapped and fed to a readout device such that the maximum elongation and maximum force can be readily determined. The instrument also integrates the force signal so as to develop a signal which is proportional to the work necessary to break the same, which signal is also fed to the readout device. The instrument is also capable of calculating and displaying the area within the resulting hysteresis loop developed as the strain is removed from the sample in cyclic testing. If desired, the instrument can also be adapted to display the force at a predetermined elongation or the elongation at a predetermined force.

BRIEF DESCRIPTION OF THE DRAWING

The sole drawing depicts the instrument of the present invention generally in a block diagram form with a tensile testing machine being shown schematically therein.

DESCRIPTION OF THE PREFERRED EMBODIMENT

The instrument for calculating and displaying the results of a tensile testing apparatus is indicated generally by the numeral 10 in the drawing and shown as being used with a schematically depicted conventional testing machine 11 having a fixed jaw 12 and movable jaw 13 which together hold the sample material 14 to be tested. Such testing machines are well known in the art and are suitable for testing a variety of materials such as rubber compounds, textiles, metals and the like. Once the sample material 14 to be tested is fixed between jaws 12 and 13, jaw 13 is moved away from jaw 12 at a constant speed sometimes up to 10,000 inches per minute until the sample breaks. In some instances where the sample may not break, the direction of travel of jaw 13 can be reversed to relieve the strain on the sample.

A transducer 15 coupled to the testing machine 11 in a conventional manner converts the movement of jaw 13 into a voltage signal which is proportional to the elongation of the sample 14 or the strain which is the ratio of the change in the length of the sample to the original length of the sample. The elongation signal is fed to an isolation amplifier 16, a conventional high impedance amplifier, which acts as a buffer to isolate the circuitry of the instrument 10 from the machine 11.

The elongation signal is then transferred to a trigger comparator relay 18, to be hereinafter described in detail, and also to hysteresis four pole double throw relay contacts 19 which, as will hereinafter be described, are actuated to the chain line position when hysteresis readings are desired. With the contacts 19A, 19B, 19C and 19D of relay 19 in the position shown in solid lines, the elongation signal is transferred through contacts 19A through a normally closed contact 20A of relay contacts 20. Then the signal is sent back through contacts 19B and to a conventional peak hold amplifier 21 wired in a follower configuration. When the sample breaks, the signal to amplifier 21 will be interrupted but the voltage proportional to maximum elongation will be held or stored for subsequent reading. Thus, the output of amplifier 21 is proportional to elongation at any instant and likewise proportional to maximum elongation after breakage.

The output of amplifier 21 is transferred to a span adjustment potentiometer 22 which essentially calibrates the elongation readings into actual units. For example, a 500 percent elongation can be made to be a 5 volt signal. Similarly, a zero offset potentiometer 23 is connected to the summing junction of a gain amplifier 24 so that the voltage signal is zero at the outset of a test, that is, with zero elongation. The amplifier 24 places the signal in a usable range for the readout instrument but inverts the signal such that an inverting unity gain amplifier 25 is necessary to send a positive signal proportional to elongation to a selector switch 26. Switch 26 can be on the instrument panel and merely provides a means to select which of a plurality of signals are fed to the readout device 28 which, in its preferred form, can be a digital voltmeter.

A transducer 30 coupled to the testing machine 11 in a conventional manner produces a voltage signal which is proportional to the force being applied to the sample 14 and which is fed to an isolation or buffer amplifier 31 similar to amplifier 16 in that it is a high impedance amplifier which isolates the circuitry of the instrument 10 from the machine 11. The signal out of amplifier 31 is directed to an amplifier 32 whose gain can be made adjustable by virtue of selectable input resistors dependent on the magnitude of force signal desired. The output of amplifier 32 is thus a positive voltage signal whose magnitude is proportional to the force being applied to the sample. This output signal is directed to a number of locations within instrument 10, all to be hereinafter described.

The force signal, for example, is transferred to a comparator relay 33 which is energized upon breakage of the sample, that is, upon a decrease in the force signal. At such time, normally closed contacts 20A are opened and normally open contacts 20B are closed. The interrupting of the input signal to amplifier 21 thus permits amplifier 21 to hold the maximum elongation in the manner previously described.

The force signal is also fed to a peak hold circuit generally indicated by the numeral 34. Peak hold circuit 34 includes a diode 35 at the input of an amplifier 36. When the output of amplifier 32 drops off because of the breakage of the sample 14, diode 35 prevents capacitor 38 from losing its charge and thus the output of amplifier 36 retains a voltage proportional to maximum force. Diode 39 in the feedback of amplifier 36 merely compensates for the voltage drop across diode 35 once conduction starts.

The maximum force signal from amplifier 36 is transferred through a span adjustment potentiometer 40 which calibrates the maximum force reading so that it can be eventually read in actual units. The signal from potentiometer 40 is then attenuated by gain amplifier 41 prior to being received by the readout device 28 through selector switch 26. Thus, upon a proper setting of switch 26, the maximum force needed to break the sample can be displayed.

The force signal is also provided to an integrating circuit to calculate the integral of the force over the time it is being applied which is the measure of the area under the force curve which, because of the constant elongation rate, approximates the work necessary to break the sample 14. The elongation signal is fed through a hysteresis double pole double throw toggle switch 47, to be hereinafter described in conjunction with the hysteresis features of the instrument 10, to a set of variable input resistors 42 and variable integrating capacitors 43 which are ganged together to be switched in so that the integration rate can be regulated as desired.

The integrating amplifier 44 is a conventional three mode track and hold type module such as a Nexus 4850 manufactured by the Teledyne Philbrick Nexus Division of Deadham, Mass. The three modes, integrate, hold and reset, are controlled by applying logic signals to the module through a double pole double throw switch 45. With the switch 45 in one position (reset) 0-volt rest logic is obtained, in a manner to be more fully described, and the integrator 44 is cleared. With the switch in its other position (run) the integrator 44 will be in the integrate mode provided that trigger comparator relay 18 has been energized and provided that comparator relay 33 is not energized. Otherwise, the integrator will be in a hold mode.

Trigger comparator relay 18, in addition to receiving the elongation signal, receives the force signal from amplifier 32. Comparator relay 18 is part of a trigger circuit which delays the start of the integration until a preselected elongation or force is reached and otherwise controls the logic signal to switch 45 when in the run position. A toggle switch (not shown) controls whether the triggering is to be made dependent on elongation or force. Whichever is employed, the force or elongation signal is applied to the positive input of the comparator relay 18 and the trigger can be kept enabled by placing a small negative voltage at the negative input of the comparator relay 18 by means of a trigger level potentiometer 46. However, if one should wish to control the integration such that it will not begin until a certain force or elongation occurs, the potentiometer 46 can be set accordingly.

Energization of trigger comparator relay 18 controls relay contacts 48. As shown, contacts 48A and 48C are normally closed with contacts 48A imposing the 0-volt logic signal through normally closed contacts 49A of relay contacts 49 to the integration mode switch 45 and thus to integrator 44. Therefore, with the contacts 48A and 49A in the position shown in the drawing, the integration can be reset. Contacts 49 are controlled by comparator relay 33 and thus it is evident that, as previously stated, comparator relay 33 must not be energized in order to close a circuit to integrator 44 because once energized, contacts 49A will open and 49B close to open the circuit.

Near the beginning of each test at a time dependent on the setting of level potentiometer 46 and dependent on whether elongation or force is used as the triggering signal, comparator relay 18 will be energized to close normally open contacts 48B and 48D which imposes the 4-volt logic signal on contacts 48B onto integrating amplifier 44 to initiate integration. At sample break, comparator relay 33 will close normally open contacts 49B to apply hold logic to the integrator and conclude integration with a voltage corresponding to area under the force curve being held at amplifier 44. This area or work signal is adjusted by a span adjustment potentiometer 50 which places the signal in actual units. A gain amplifier 51 places the signal in a usable range for selective readout by device 28 through the switch 26.

The force signal from amplifier 32 can also be routed via line 55 to the contacts 48C and 48D which signal is normally grounded through normally closed contact 48C thus keeping the force signal from adversely effecting the rest of the circuitry, such as integrating amplifier 44, prior to the time integration is to begin. Line 56 ties contact 48D to the input side of the integrating circuitry such that when trigger comparator relay indicates that it is time for integration to begin, the closing of contact 48D imposes the force signal on he integrating circuitry.

In the event that it would be desired to readout the force at a preselected elongation (rather than maximum force, which would be the normally obtained data), contacts 48C and 48D may also be used for that purpose. For example, by routing the force signal from amplifier 32 through the normally closed contacts 48C and then to diode 35 of the peak hold circuitry 34 and by connecting contact 48D to ground, the force input signal to the diode will rapidly drop off once the comparator 18 fires at an elongation selected by potentiometer 46. Thus, the output of the peak hold circuitry would be the force at the preselected elongation rather than the maximum force as previously described.

Similarly, when desired to readout the elongation at a preselected force, the elongation signal could be routed from amplifier 16 through normally closed contacts 48C and then to peak hold amplifier 21 with contact 48D being grounded. Then when comparator 18 fires, the signal to the peak hold amplifier 21 will rapidly drop off as if a break had occurred and the output of amplifier 21 will be the elongation at the force previously described.

In the event that the instrument 10 is to be used for cyclic testing in situations where the sample does not break but rather is alternately stretched and then retracted in a tensile testing machine 11 of the type which can relieve the force by reversing the direction of jaw movement, it could be important to known the energy lost by the sample because of having undergone elongation. To this end, the instrument 10 is capable of operation in a hysteresis mode wherein the area within the hysteresis curve can be calculated and displayed.

Energization of coil 19E of relay 19 moves switches 19A, 19B, 19C, 19D and 47A and 47B to the chain line position shown in the drawing as previously described. This permits the instrument 10 to readout area under the hysteresis curve in the following manner. The elongation signal from amplifier 16 is no longer routed to peak hold amplifier 21 by virtue of the opening of switch 19A. The force signal from amplifier 32 is no longer routed through switch 47B directly to the integrator 44 but rather is transferred through switch 47B, contacts 20A, switch 19B and then to the integrator until the peak force is reached. The force signal from amplifier 32 is routed through switch 19C to amplifier 24 which inverts the signal and transfers it through resistor 58 and switch 19D to normally open contacts 20B. Resistor 58 is added to the gain amplifier circuit 24 to merely render amplifier 24 a unity gain inverter.

When peak force is reached, comparator relay 33 is energized to open contacts 20A and close contacts 20B to transfer a negative force signal to the integrator through switch 19D and contacts 20B. Thus, as the sample is being elongated, the integrator receives the positive force signal, and when the elongation force is reversed by the machine 11, the integrator receives a negative voltage signal proportional to the force being relieved. At the end of one complete cycle of the machine 11, the output of amplifier 51 will therefore correspond to the area within the hysteresis curve. The trigger level potentiometer 46 can be set to disable the integrator as zero elongation, that is, the end of the test, is approached.

It should thus be evident that an instrument constructed as described herein will enable one to readily ascertan all desirable results of a tensile test and otherwise accomplish the objects of the invention and to improve the tensile testing art.

What we claim is:

1. Apparatus for determining and reading out results of a tensile test in a tensile testing machine wherein a force is applied to a sample material to elongate the same comprising, means to produce a signal proportional to the amount of force being applied to the sample by the machine; means to produce a signal proportional to the elongation of the sample; means receiving said signal proportional to force and producing a signal proportional to the maximum force to which the sample is subjected; means receiving said signal proportional to elongation and producing a signal proportional to the maximum elongation of the sample; integrating means receiving said signal proportional to force and calculating the amount of work required to elongate the sample and producing a signal proportional thereto; comparator means receiving said signal proportional to force; signal means to control said integrating means; means actuated by said comparator means to change said signal means to terminate the calculating of said integrating means; and means receiving and selectively reading out said signals proportional to the maximum force, maximum elongation and work.

2. Apparatus according to claim 1 wherein said means producing a signal proportional to the maximum force includes peak hold circuitry means which senses and maintains the maximum signal received from said means to produce a signal proportional to the amount of force.

3. Apparatus according to claim 1 wherein said comparator means includes a relay and said means for producing a signal proportional to maximum elongation includes means to interrupt said signal proportional to elongation and means to hold the elongation signal once interrupted, said relay actuating said means to interrupt said signal proportional to elongation.

4. Apparatus according to claim 1, wherein said integrating means includes an amplifier whose integration rate is controlled by variable resistors and variable capacitors.

5. Apparatus according to claim 1 wherein said comparator means includes a relay and said signal means is a logic signal to control said integrating means.

6. Apparatus for determining and reading out results of a tensile test in a tensile testing machine wherein a force is applied to a sample material to elongate the same comprising, means to produce a signal proportional to the amount of force being applied to the sample by the machine; means to produce a signal proportional to the elongation of the sample; means receiving said signal proportional to force and producing a signal proportional to the maximum force to which the sample is subjected; means receiving said signal proportional to elongation and producing a signal proportional to the maximum elongation of the sample; integrating means receiving said signal proportional to force and calculating the amount of work required to elongate the sample and producing a signal proportional thereto; means to adapt said integrating means to calculate the energy lost by the sample due to its elongation; and means receiving and selectively reading out said signals proportional to the maximum force, maximum elongation, energy lost and work.

7. Apparatus according to claim 6 wherein said means to adapt includes means to impose a negative signal proportional to force on said integrating means so that after one complete cycle of the tensile testing machine, the output of said integrating means is proportional to the energy lost by the sample.

8. Apparatus according to claim 7 further comprising comparator relay means receiving said signal proportional to force and means to interrupt said signal proportional to force to said integrating means, said comparator relay means actuating said means to interrupt and said means to adapt.

9. Apparatus for determining and reading out results of a tensile test in a tensile testing machine wherein a force is applied to a sample material to elongate the same comprising, means to produce a signal proportional to the amount of force being applied to the sample by the machine; means to produce a signal proportional to the elongation of the sample; means receiving said signal proportional to force and producing a signal proportional to the maximum force to which the sample is subjected; means receiving said signal proportional to elongation and producing a signal proportional to the maximum elongation of the sample; integrating means receiving said signal proportional to force and calculating the amount of work required to elongate the sample and producing a signal proportional thereto; trigger means to delay the calculation of said integrating means selectively until a predetermined elongation and force is reached after the outset of the tensile test; and means receiving and selectively reading out said signals proportional to the maximum force, maximum elongation and work.

10. Apparatus for determining and reading out results of a tensile test in a tensile testing machine wherein a force is applied to a sample material to elongate the same comprising, means to produce a signal proportional to the amount of force being applied to the sample by the machine; means to produce a signal proportional to the elongation of the sample; means receiving said signal proportional to force and producing a signal proportional to the maximum force to which the sample is subjected; means receiving said signal proportional to elongation and producing a signal proportional to the maximum elongation of the sample; integrating means receiving said signal proportional to force and calculating the amount of work required to elongate the sample and producing a signal proportional thereto; trigger means to delay the calculation of said integrating means until a predetermined point after the outset of the tensile test, said trigger means including comparator relay means which upon actuation permits said signal proportional to force to be received by said integrating means; and means receiving and selectively reading out said signals proportional to the maximum force, maximum elongation and work.

11. Apparatus according to claim 10 wherein said comparator relay means selectively receives said signal proportional to force and said signal proportional to elongation, said trigger means including means to actuate said comparator relay means selectively upon a preselected force and preselected elongation.

12. Apparatus according to claim 11 wherein said comparator relay means can also actuate said means receiving said signal proportional to force so that the signal produced thereby is proportional to the force at a preselected elongation, said preselected elongation being determined by said means to actuate said comparator relay means.

13. Apparatus according to claim 11 wherein said comparator relay means can also actuate said means receiving said signal proportional to elongation so that the signal produced thereby is proportional to the elongation at a preselected force, said preselected force being determined by said means to actuate said comparator relay means.

* * * * *